United States Patent
Rossignol et al.

[11] Patent Number: 6,029,109
[45] Date of Patent: Feb. 22, 2000

[54] METHOD FOR CALCULATING THE TORQUE OF AN INTERNAL COMBUSTION ENGINE

[75] Inventors: Alain Rossignol, Toulouse; Michel Suquet, Villeneuve Tolosane, both of France

[73] Assignee: Siemens Automotive S.A., Toulouse-Cedex, France

[21] Appl. No.: 09/171,283
[22] PCT Filed: Mar. 20, 1996
[86] PCT No.: PCT/EP97/01416
§ 371 Date: Oct. 15, 1998
§ 102(e) Date: Oct. 15, 1998
[87] PCT Pub. No.: WO97/39323
PCT Pub. Date: Oct. 23, 1997

[30] Foreign Application Priority Data

Apr. 15, 1996 [FR] France ..................... 96 04672

[51] Int. Cl.$^7$ ............... G01M 15/00; G01L 3/00
[52] U.S. Cl. ................. 701/110; 701/111; 73/117.3
[58] Field of Search ............... 701/110, 111, 701/101, 102; 73/116, 117.3

[56] References Cited

U.S. PATENT DOCUMENTS

| | | | |
|---|---|---|---|
| 4,691,288 | 9/1987 | Kay et al. | 73/117.3 |
| 4,697,561 | 10/1987 | Citron | 701/110 |
| 5,377,537 | 1/1995 | James | 73/116 |
| 5,621,644 | 4/1997 | Carson et al. | 73/116 |
| 5,771,482 | 6/1998 | Rizzoni | 701/101 |
| 5,878,366 | 3/1999 | Schricker et al. | 701/111 |

FOREIGN PATENT DOCUMENTS 2689934   10/1993   France .

*Primary Examiner*—Willis R. Wolfe
*Assistant Examiner*—Hieu T. Vo
*Attorney, Agent, or Firm*—Herbert L. Lerner; Laurence A. Greenberg

[57] ABSTRACT

According to this process, a) it defines, for each phase for the combustion of the fuel/air mixture, an observation window delimited by predetermined angular positions of the crankshaft, b) it measures in each window a series of time gaps ($\Delta T_i$), dividing the movements of the crankshaft into predetermined angular positions, c) it calculates two linear combinations ($\Sigma a_i \Delta T_i$) and ($\Sigma b_i \Delta T_i$), of the time gaps ($\Delta T_i$), each of the coefficients ($a_i$) and ($b_i$) of these combinations being chosen so as to amplify the variations, in observation window, of the alternating component of the angular speed ($\Omega_1$, $\Omega_2$) of the crankshaft during the measurement of the corresponding time gap ($\Delta T_i$), in first and second operating modes of the engine, respectively, for which the alternating components observed ($\Omega_0$, $\Omega_{90}$) are phase-shifted relative to one another by a predetermined angle ($\Phi_0$), and d) it obtains an estimate of the torque from the value of a norm applied to the two linear combinations.

11 Claims, 1 Drawing Sheet

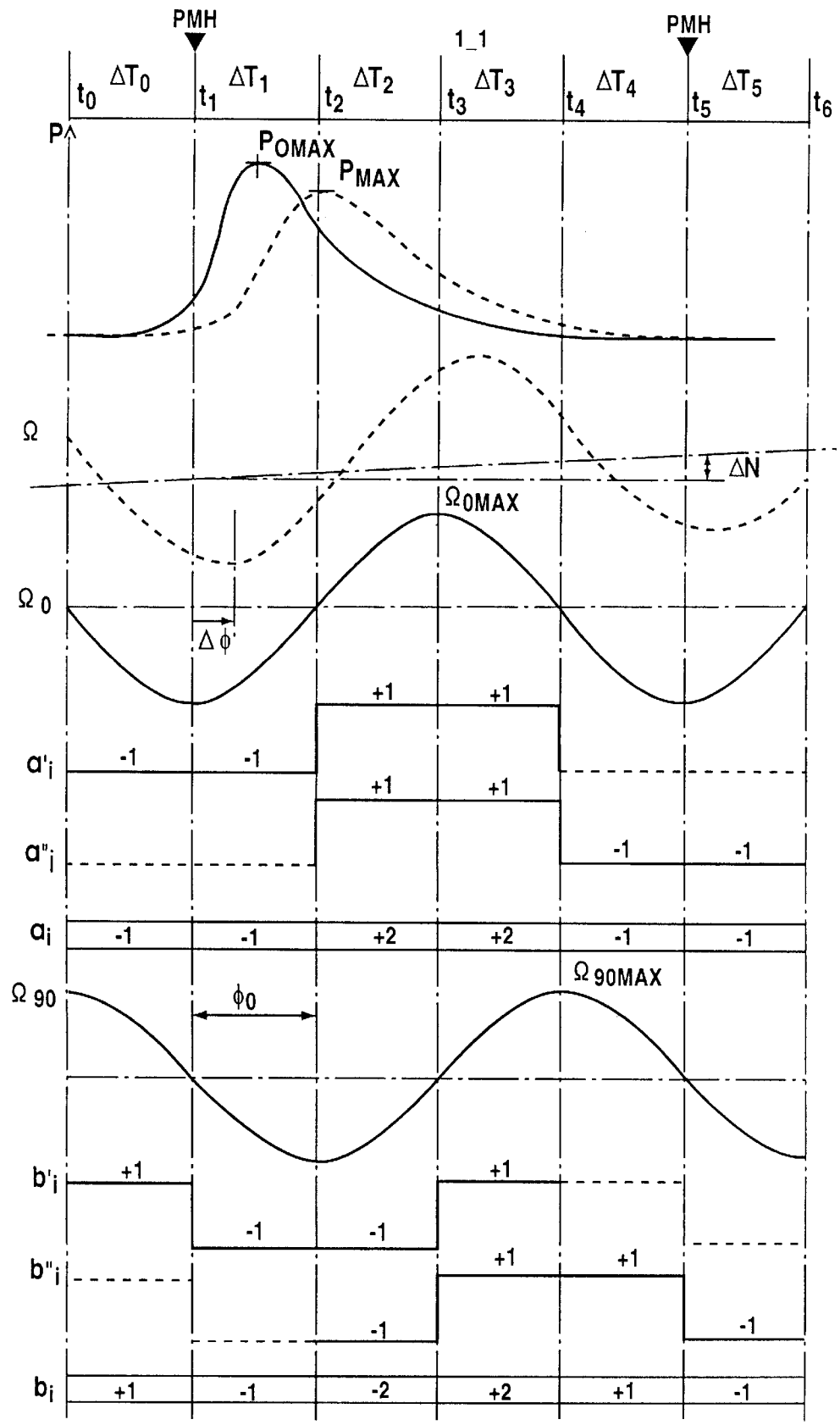

METHOD FOR CALCULATING THE TORQUE OF AN INTERNAL COMBUSTION ENGINE

BACKGROUND OF THE INVENTION

Field of the Invention

The present invention relates to a process for estimating the torque delivered by an internal combustion engine, and more particularly to a process of this type that works based on the observation of variations in the rotation speed of the crankshaft of the engine.

The torque delivered by an internal combustion engine is an important parameter for characterizing the working condition and the performance of an engine of this type, particularly when the latter is used to power an automobile. Devices known as "torque meters" make it possible to measure the torque delivered by an engine during bench testing. It is practically impossible to install such a device in an automobile, specifically for reasons of cost. Various processes have also been proposed for estimating torque from measurements of the instantaneous engine speed delivered by a sensor that is commonly installed today in automobiles in which the engine is controlled by a computer supplied with various signals, including the one supplied by the speed sensor. For reference, it is possible to consult the 1989 publication by W. B. RIBBENS and G. RIZZONI entitled "Applications of Precise Crankshaft Position Measurements for Engine Testing, Control and Diagnosis," publication number SAE 890885 of the "Society of Automotive Engineers" of the USA. This publication describes a process comprised of performing matrix algebra on instantaneous speed measurements taken during each engine cycle, in order to deduce from the latter the absolute value of the torque for each cylinder and thus to detect any abnormal variations in this torque. These calculations are complex and require powerful computing means which are not currently possible to install in an automobile. Moreover, according to this publication, it appears that this process is only usable at low speeds (less than 3500 rpm). Other torque estimating processes are based on an observation of variations in the speed of the engine within a time "horizon" that covers several successive fuel/air mixture combustion phases in several cylinders of the engine. An abnormal combustion, such as a misfire for example, in one of the cylinders being observed, substantially disturbs the global observation made and hence the estimate obtained from it.

Also known from European patent application 532 419, filed in the name of Régie Nationale des Usines Renault SA, are a process and a device for producing a value representative of the average "gas" torque produced by each combustion of a mixture in the cylinders of an internal combustion engine, the process being comprised of generating a "primary" value representing the duration of the passage in front of a sensor of each of a plurality of reference marks disposed on a ring integral with the flywheel or the crankshaft of the engine, of operating on the primary value to produce two secondary values, respectively representing the average angular speed of the reference marks during a combustion period in the engine and the projection onto a phase reference line of the marks related to the angular combustion periods, and the alternating component of the instantaneous angular speed of the marks, and of combining these two secondary values to produce a value representing the torque sought.

This process is capable of providing a satisfactory result insofar as 1) the "combustion center", or maximum pressure in a cylinder during a combustion, remains substantially set at a fixed angular position of the crankshaft and 2) the average speed of the engine does not vary substantially in the interval between two top dead centers.

The sole figure of the appended drawing represents graphs of the variations of the pressure P in a cylinder in which a combustion occurs, and the corresponding variations in angular speed $\Omega$, between two top dead centers reached consecutively by two pistons running in two cylinders of, for example, a four-cylinder engine. Experimentally, it is observed that at high speeds, with a fuel/air mixture of normal richness, the center of pressure $P_{0\ max}$ remains centered on a position that is fixed relative to the top dead center, located in the first quarter of the angular interval separating two consecutive top dead centers. The corresponding fluctuations of the angular speed of the engine are represented in $\Omega_0$ and have a maximum $\Omega_{0\ max}$ located substantially at the end of the second quarter of the interval between top dead centers.

On the other hand, in other operating modes of the engine, For example at low speed or average speed with a lean fuel/air mixture, the pressure peak can be offset by up to a 45° angle of rotation of the crankshaft (position $P_{max}$) relative to the center of pressure $P_{0\ max}$. A corresponding phase shift is observed in the corresponding angular speed $\Omega_{90}$, which in this case is phase-shifted by $\pi/2$ relative to the substantially sinusoidal fluctuations of the speed $\Omega_0$, at the frequency of the top dead centers.

Outside these operating modes, an intermediate phase shift $\Delta\Phi$ of $\Omega$ relative to $\Omega_0$ of between 0 and $\pi/2$ is observed.

It is understood that an algorithm for calculating an estimate of the torque of an internal combustion engine which does not take into account this displacement of the peak or maximum angular speed of the crankshaft, cannot provide a satisfactory estimate of this torque in all of the possible operating modes of the engine.

SUMMARY OF THE INVENTION

The object of the present invention is precisely to provide a process for estimating this torque that is reliable no matter what the operating mode of the engine, and no matter what the rate of the variations in the average speed of this engine.

This object of the invention, as well as others that will emerge through the reading of the following description, are achieved with a process for estimating the torque delivered by an internal combustion engine from the variations in the rotation speed of the crankshaft of the engine, this process being remarkable in that a) it defines, for each phase for the combustion of a fuel/air mixture in each cylinder of the engine, an observation window delimited by predetermined angular positions of the crankshaft, b) it measures in each window a series of time gaps $\Delta T_i$, dividing the movements of the crankshaft into predetermined angular positions, c) it calculates two linear combinations $\Sigma a_i \Delta T_i$ and $\Sigma b_i \Delta T_i$ of the time gaps $\Delta T_i$, each of the coefficients $a_i$ and $b_i$ of these combinations being chosen so as to amplify the variations, in this observation window, of the alternating component of the angular speed of the crankshaft during the measurement of the corresponding time gap $\Delta T_i$, in first and second operating modes of the engine, respectively, for which the alternating components observed are phase-shifted relative to one another by a predetermined angle, and d) it obtains an estimate of the torque from the value of a norm applied to the two linear combinations and expressed in relation to the third power $\Delta T^3$ of the average time gap measured in a predetermined window.

As will be seen below, this process makes it possible to accurately estimate the torque delivered by the engine in all of its operating modes, even when they are as different as operating at normal or high speed and operating at low speed or average speed and low richness.

Other characteristics and advantages of the present invention will emerge through the reading of the following description and the examination of the appended drawing, in which the sole FIGURE is a group of graphs useful to the understanding of the process according to the invention.

DESCRIPTION OF THE PREFERRED EMBODIMENT

As illustrated in this FIGURE, this process is essentially based on the observation of the effects of a combustion of a fuel/air mixture in a cylinder of the internal combustion engine on the angular speed $\Omega$ of the crankshaft of this engine. After ignition of the mixture, the pressure in the cylinder reaches a maximum $P_{0\ max}$ shortly after the top dead center at normal or high speed, or a maximum that is more or less delayed relative to $P_{0\ max}$, at low speed for example, as indicated in the preamble of the present specification. Next, there is an expansion of the gas in the cylinder, an expansion which continues until another piston in turn reaches its top dead center in the course of a standard four-stroke operating cycle. For purposes of clarity, the following description, given as an illustrative and non-limiting example only, will relate to a four-cylinder internal combustion engine.

In the FIGURE, it is clear that the maxima of angular speed $\Omega_{0\ max}$ and $\Omega_{90\ max}$ corresponding to the maxima of pressure $P_{0\ max}$ and $P_{max}$, respectively, are approximately centered at the end of the first quarter and at the halfway point, respectively, of the time interval that separates two consecutive movements of pistons of the engine to the top dead center. It is also apparent in this figure that the variations in the angular speed of the crankshaft of the engine are substantially sinusoidal, with a frequency equal to the frequency of the successive movements of the cylinders of the engine to their top dead center. It is understood that these variations are those of the alternating component of the angular speed of the engine, which also includes a direct component. The variations of the latter correspond to variations $\Delta N$ in the speed N of the engine, which is illustrated in the FIGURE by a variation in the slope of the axis of the curve representing $\Omega$.

According to the invention, for each combustion phase of the fuel/air mixture in each cylinder of the engine, an observation window is defined which is wider than the angular space separating two consecutive movements of two pistons to the top dead center, in order to allow a complete observation of the acceleration and deceleration phases of the crankshaft due to the combustion of the fuel/air mixture in this cylinder of the engine. However, this observation window is advantageously less than or equal to 1.5 times this angular space. Thus, 7 angular positions of the crankshaft are defined, which are reached successively at the instants $t_0$ through $t_6$, these instants being separated by time gaps $\Delta T_i = t_{i+1} - t_i$ ($i=0$ through 5). The seven angular positions are angularly separated from one another by a constant angle. Thus, between two top dead centers, there are four time gaps whose limits substantially coincide with the characteristic points of the wave form of the angular speed, hence with either a maximum, a minimum, or a zero crossing. It will be noted that the first gap $\Delta T_0$ and the last one $\Delta T_5$ are each located in an interval between top dead centers adjacent to the one on which the observation of the variations in the angular speed is primarily based.

Before continuing, it should be noted that if the time gaps $\Delta T_{n+1}$ and $\Delta T_n$ delimited by three equally spaced angular positions reached at the instants $t_{n-1}$, $t_n$, $t_{n+1}$ are measured, it demonstrates that the instantaneous torque at the instant $T_{n+1}$ is such that:

$$C_{n-1} \cong J\alpha \cdot \frac{1}{\Delta T_n^3} \cdot (\Delta T_{n+1} - \Delta T_n) \tag{1}$$

J being the moment of inertia of the rotating part of the engine and $\alpha$ the constant angular deviation of two successive angular positions.

J and $\alpha$ being constant, it is thus clear that there is a proportional relationship between the torque and the ratio $$\frac{\Sigma}{\Delta T^3}$$

where $\Sigma = \Delta T_{n+1} - \Delta T_n$ is a linear combination of the time gaps measured, and $\Delta T^3$ the third power of the average tire gap measured, $\Delta T_n$ being very close to $\Delta T_{n+1}$ during an observation of time gaps in the same measurement window.

According to the present invention, an estimate of the torque is based on the existence of a proportional relationship of the same type between such a ratio and the torque, the expression $\Sigma$ occurring in the ratio being modified in order to ensure an accurate estimate of the torque, no matter what the operating mode of the engine. For this reason, this expression must take into account a potential spatia shift of the wave form of the variation in the angular speed, which can occupy any position between either of the positions illustrated in the drawing in $\Omega_0$ and $\Omega_{90}$.

In order to do this, according to the invention, two linear combinations $\Sigma a_i \cdot \Delta T_i$, and $\Sigma b_i \cdot \Delta T_i$ of the time gaps $\Delta T_i$ are calculated. The coefficients $a_i$ and $b_i$ are correlated to the variations in the angular speeds $\Omega_0$, $\Omega_{90}$, respectively, so as to amplify the variations, in the observation window, of the alternating component of the angular speed of the crankshaft observed, in a first mode of operation at a constant speed, for which the combustion peak occupies its most probable position, and in a second mode of operation in which the angular speed is phase-shifted from that of the first mode by a predetermined angle $\Phi_0$.

The first linear combination makes it possible to obtain a sort of "projection" of the variations in the speed $\Omega$ along the phase "axis" of the curve $\Phi_0$.

The second linear combination produces a similar projection on the phase axis of the curve representing the phase-shifted speed.

Advantageously, this phase-shift $\Phi_0$ is chosen in such a way that $\Phi_0 = \pi/2$. In effect, having calculated the values of the two linear combinations $\Sigma a_i \Delta T_i$ and $\Sigma b_i \Delta T_i$, it is possible to apply to these values the euclidean norm or simple quadratic:

$$[(\Sigma a_i \cdot \Delta T_i)^2 + (\Sigma b_i \cdot \Delta T_i)^2]^{1/2}$$

and the norm thus calculated is entered into an expression like the expression (1) above, in which it replaces the linear combination $(\Delta T_{n+1} - \Delta T_n)$, in order to obtain an estimate of the instantaneous torque delivered by the engine.

However, the phase shift $\Phi_0$ chosen can be different from $\pi/2$, especially when the marks formed on the ring or "target" integral with the flywheel of the engine do not make it possible to set this phase shift at π/2. In this case, the norm to be calculated takes the following, slightly more complex form:

$$[(\Sigma a_i \Delta T_i)^2 + (\Sigma b_i \Delta T_i)^2 + 2\Sigma a_i \Delta T_i \Sigma b_i \Delta T_i \cos \Phi_0]^{1/2}$$

By way of an illustrative and non-limiting example only, a process for calculating the coefficients $a_i$ and $b_i$ occurring in the norms given above will now be described.

First of all, it is noted that if the variations ΔN in the speed of the engine corresponding to the variations in the average angular speed of this engine are disregarded, only the variations in the instantaneous angular speed between two top dead centers, that is, around a single combustion, need be observed in order to estimate the engine torque delivered by this combustion. In the example illustrated in the FIGURE, it is therefore possible to be limited to a linear combination with four coefficients, acting on the time gaps $\Delta T_i$ measured between the instants $t_1$ and $t_5$, for amplifying the peak-to-peak variation in speed in the reduced observation window $[t_1, t_5]$ corresponding to a single interval between top dead centers and to a single combustion, while omitting the direct component (the average speed N of the engine).

In this case, coefficients $a_i$ (or $b_i$) are chosen which are alternately positive (+1 for example) or negative (−1 for example) depending on whether the instantaneous speed Ω is above or below the average speed. According to the invention, $a_i$ (or $b_i$) is chosen so that $\Sigma a_i$ (or $\Sigma b_i$) is null, in order to eliminate the influence of the direct component.

Advantageously, according to the present invention, in order to eliminate the influence of a variation ΔN in the average speed (or speed N) like that illustrated in the drawing for Ω, an observation window $[t_0, t_6]$ is chosen which is enlarged to 1.5 times the period of the movement to the top dead center, this window being centered on the middle ($t_3$) of the interval between two consecutive top dead centers. Moreover, each of the coefficients $a_i$, $b_i$ is defined as being the sum of two coefficients such that $a_i = a'_i + a''_i$ and $b_i = b'_i + b''_i$. The coefficients $a'_i$ and $b'_i$ are defined in four time gaps ΔTi in the interval $[t_0, t_4]$, while the coefficients $a''_i$ and $b''_i$ are defined in the time gaps of the interval $[t_2, t_6]$, each of these intervals thus having a duration substantially equal to that of an interval between two consecutive top dead centers. The sums $\Sigma a'_i$, $\Sigma a''_i$, $\Sigma b'_i$ and $\Sigma b''_i$ are all null in accordance with what is indicated above, in order to eliminate the influence of the direct component.

It is therefore noted that the influence of a variation ΔN on the first combination $\Sigma a'_i \Delta T_i$ is the same as in the second one $\Sigma a''_i \Delta T_i$, but with an opposite sign, since in the window $[t_2, t_6]$ the variation of $\Omega_0$ is in phase opposition to that observed in the window $[t_0, t_4]$. These influences are therefore eliminated in the sums $a_i = a'_i + a''_i$ calculated term to term for the corresponding time gaps $\Delta T_i$. The same is true for the coefficients $b_i$ of the linear combination $\Sigma_{ai} \Delta T_i$, chosen so as to produce the same amplification as $\Sigma a_i \Delta T_i$.

Thus, it is clear that the influence of a variation ΔN in the speed N of the engine is eliminated by breaking down each coefficient $a_i$, $b_i$ into a sum of two coefficients $a'_i + a''_i$, $b'_i + b''_i$, the sequences of the coefficients $a'_i$, $a''_i$; $b'_i$, $b''_i$, respectively, each having a null sum, the sequences each pair of sequences ($a'_i$, $a''_i$; $b'_i$, $b''_i$) eliminating one another through the cancellation, in each sequence, of the coefficients associated with time gaps symmetrical to time gaps of the other sequence relative to the median instant $t^3$ of the observation window $[t_0, t_6]$.

The figure illustrates a method for calculating the coefficients $a_i$, $b_i$, given only as an illustrative and non-limiting example of various other calculation methods that could be envisaged and used by one skilled in the art.

Thus, for the coefficients ai, this method begins with two rectangular wave forms $a'_i$, $a''_i$, which trace the angular speed $\Box_0$ in the intervals $[t_0, t_4]$ and $[t_2, t_6]$, respectively, these wave forms varying between the levels −1 and +1, respectively, Each wave form traces the angular speed in four time gaps. By adding, for each gap $\Delta T_i$, the levels reached by bozt wave forms, it is possible to obtain the series of coefficients a appearing on the line $a_i$ of the graph in FIG. 1. in which:

$a_0 = -1$, $a_1 = -1$, $a_2 = +2$, $a_3 = +2$, $a_4 = -1$, $a_5 = -1$.

Doing the same for the coefficients $b_i = b'_i + b''_i$ produces:

$b_0 = 1$, $b_1 = -1$, $b_2 = -2$, $b_3 = +2$, $b_4 = +1$, $b_5 = -1$.

It is understood that, by virtue of the present invention, the influence of the significant time gaps $\Delta T_i$ is entered into the calculation of the torque, no matter what the position of the wave form of the angular speed in the observation window. If the latter is near the curve $\Box_0$, it is the $\Sigma b_i \Delta T_i$ that enters this influence, the other sum $\Sigma b_i \Delta T_i$ in this case being minimized by the coefficients $b_i$. If the wave form is shifted toward the curve $\Omega_{90}$, an inverse phenomenon is observed. Thus, no matter what the operating mode of the engine, the significant linear combination is entered into the calculation of the torque.

The implementation of the process according to the invention in an automobile requires no computing hardware other than that which is normally installed for the electronic monitoring of the control parameters of the engine, such as the injection time or the timing angle at ignition. The electronic computer classically used for this purpose receives signals from various sensors, including a sensor which senses the passage of teeth formed on the periphery of a wheel integral with the output shaft of the engine, the computer analyzing the signals supplied by this sensor in order to determine, at any instant, the angular position of the crankshaft of the enaine and hence the phasing of the various cylinders of this engine. These signals, and the appropriate programming, thus allow the computer to execute the torque estimating process according to the invention, which uses only software, an especially economical solution that is well adapted to the high production volumes characteristic of the automobile industry.

In addition to the essential advantage of the present invention, which is to provide a reliable estimate of the torque delivered by the engine no matter what its operating mode, even in the presence of rapid variations in the average angular speed of the crankshaft in the interval between two top dead centers, it is noted that the estimate produced, at each instant, involves only the accelerations and decelerations due to a combustion of the fuel/air mixture in only one of the cylinders of the engine. In the prior art, the measurement window used normally covered several successive combustions, the effects of which cancelled one another out, to the detriment of the precision of the estimate of the torque delivered by the engine.

It is understood that the invention is not limited to the embodiment described and represented, which is given only as an example. Thus, the invention is not limited to its implementation in a four-cylinder engine and could easily be adapted by one skilled in the art to a five- or six-cylinder engine, for example.

We claim:

1. A process for estimating a torque delivered by an internal combustion engine from variations in a rotational speed of a crankshaft of the engine, which comprises:

defining, for each phase in a combustion of a fuel/air mixture in each cylinder of an internal combustion engine, an observation window delimited by predetermined angular positions of a crankshaft of the engine;

measuring in each window a series of time gaps dividing a movement of the crankshaft into predetermined angular positions;

calculating two linear combinations of the time gaps, and choosing coefficients of the combinations so as to amplify variations, in the observation window, of an alternating component of the angular speed of the crankshaft during a measurement of the corresponding time gap, in first and second operating modes of the engine, respectively, in which the alternating components observed are phase-shifted relative to one another by a predetermined angle; and obtaining an estimate of the torque from a value of a norm applied to the two linear combinations and expressed in relation to a third power of the average time gap measured in a predetermined window.

2. The process according to claim 1, which comprises defining the first operating mode at a substantially constant speed, with a combustion peak located at a most probable position.

3. The process according to claim 2, which comprises defining the second operating mode at a combustion peak that is phase-shifted by substantially $\Phi_0=90°$ relative to the combustion peak of the first operating mode.

4. The process according to claim 1, which comprises defining an observation window covering the angular space separating two consecutive movements to top dead center of two cylinders of the engine, wherein the observation window overlaps either side of the angular space so as to have a width at least 1.5 times the angular space.

5. The process according to claim 4, wherein the internal combustion engine is a four-cylinder engine, and wherein the time gaps corresponding to a constant angular deviation equal one quarter of the angular space separating two consecutive top dead centers, and the observation window covers six angular deviations.

6. The process according to claim 5, wherein limits of the various successive angular deviations coincide with characteristic points of a wave form of the alternating component of the angular speed of the engine between two consecutive top dead centers.

7. The process according to claim 6, which comprises selecting the characteristic points from the group consisting of maxima, minima, and zero crossings.

8. The process according to claim 7, which further comprises eliminating an influence of a direct component of the angular speed of the engine by choosing the coefficients in such a way that the sums thereof are null.

9. The process according to claim 8, which comprises eliminating an influence of a variation of the speed of the engine by breaking down each coefficient into a sum of two coefficients, the sequences of the coefficients, respectively, each having a null sum, the sequences of each pair of sequences eliminating one another through the cancellation, in each sequence, of the coefficients associated with time gaps symmetrical to time gaps of the other sequence relative to the median instant ($t_3$) of the observation window.

10. The process according to claim 9, wherein a first coefficient is $a_0=-1, a_1=-1, a_2=+2, a_3=+2, a_4=-1, a_5=-1$, and a second coefficient is $b_0=+1, b_1=-1, b_2=-2, b_3=+2, b_4=+1$, and $b_5=-1$.

11. The process according to claim 1, which further comprises applying a euclidean norm to the linear combinations.

* * * * *

UNITED STATES PATENT AND TRADEMARK OFFICE
CERTIFICATE OF CORRECTION

PATENT NO. : 6,029,109
DATED : February 22, 2000
INVENTOR(S) : Alain Rossignol et al.

It is certified that error appears in the above-identified patent and that said Letters Patent is hereby corrected as shown below:

Column 4,
Formula 1, "$C_{n-1}$" should read -- $C_{n+1}$ --.
Line 50, "curve $\phi_0$" should read -- curve $\Omega_0$ --.

Column 5,
Line 54, "$\Sigma a_i \Delta T_i$" should read -- $\Sigma b_i \Delta T_i$ --.

Column 6,
Line 5, "speed $\square_0$" should read -- speed $\Omega_0$ --.
Line 9, "bozt" should read -- both --.
Line 18, "curve $\square_0$" should read -- curve $\Omega_0$ --; and "$\Sigma b_i \Delta T_i$" should read -- $\Sigma a_i \Delta T_i$ --.

Signed and Sealed this

Twenty-sixth Day of March, 2002

Attest:

Attesting Officer

JAMES E. ROGAN
*Director of the United States Patent and Trademark Office*